Oct. 28, 1958  A. R. PEZZILLO  2,857,849
MOTOR DRIVEN PUMPING UNITS
Filed Nov. 13, 1953  6 Sheets-Sheet 1
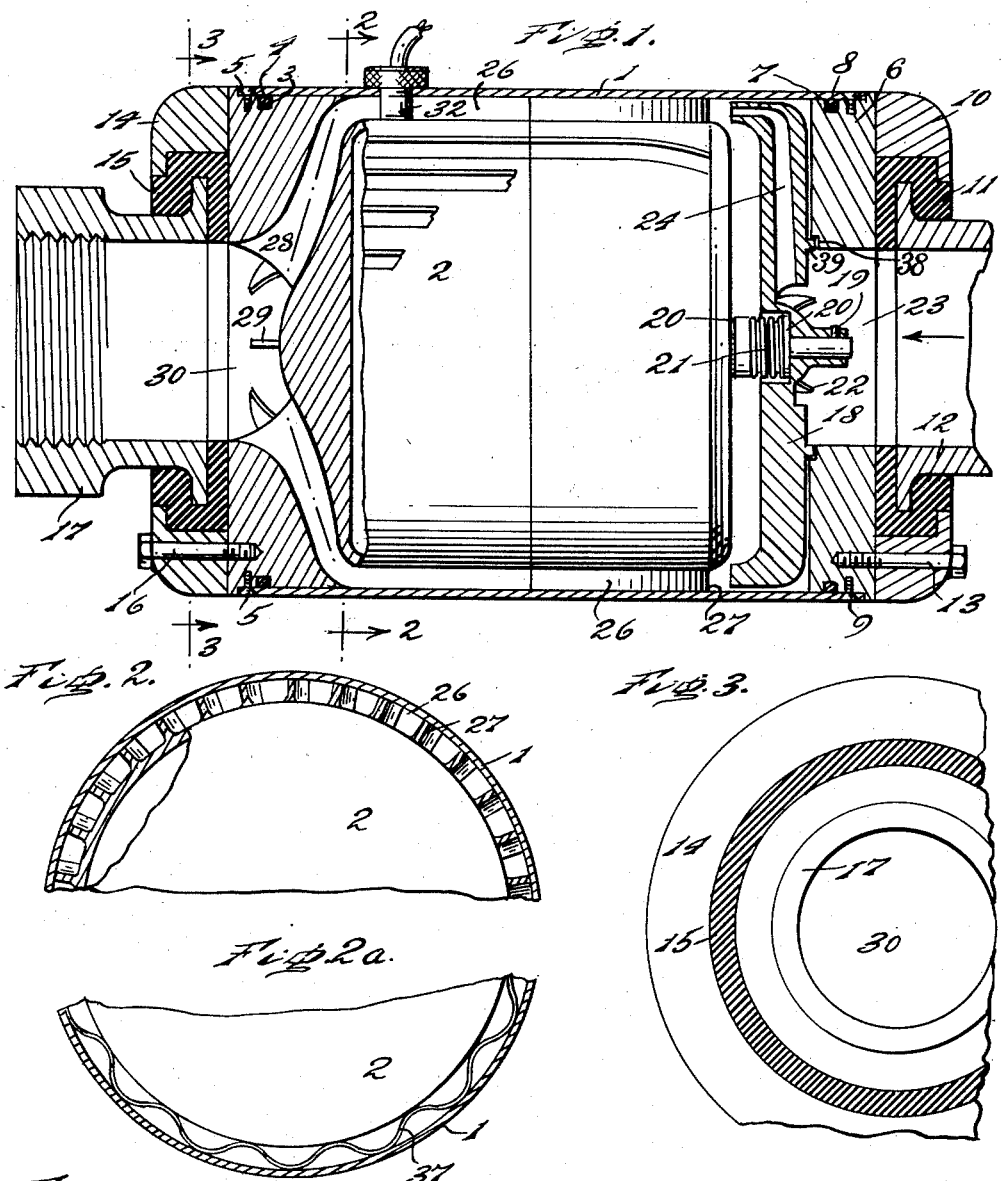
Inventor
Albert R. Pezzillo
by
Herbert P. Fairbanks
Attorney Oct. 28, 1958     A. R. PEZZILLO     2,857,849
MOTOR DRIVEN PUMPING UNITS
Filed Nov. 13, 1953     6 Sheets-Sheet 2
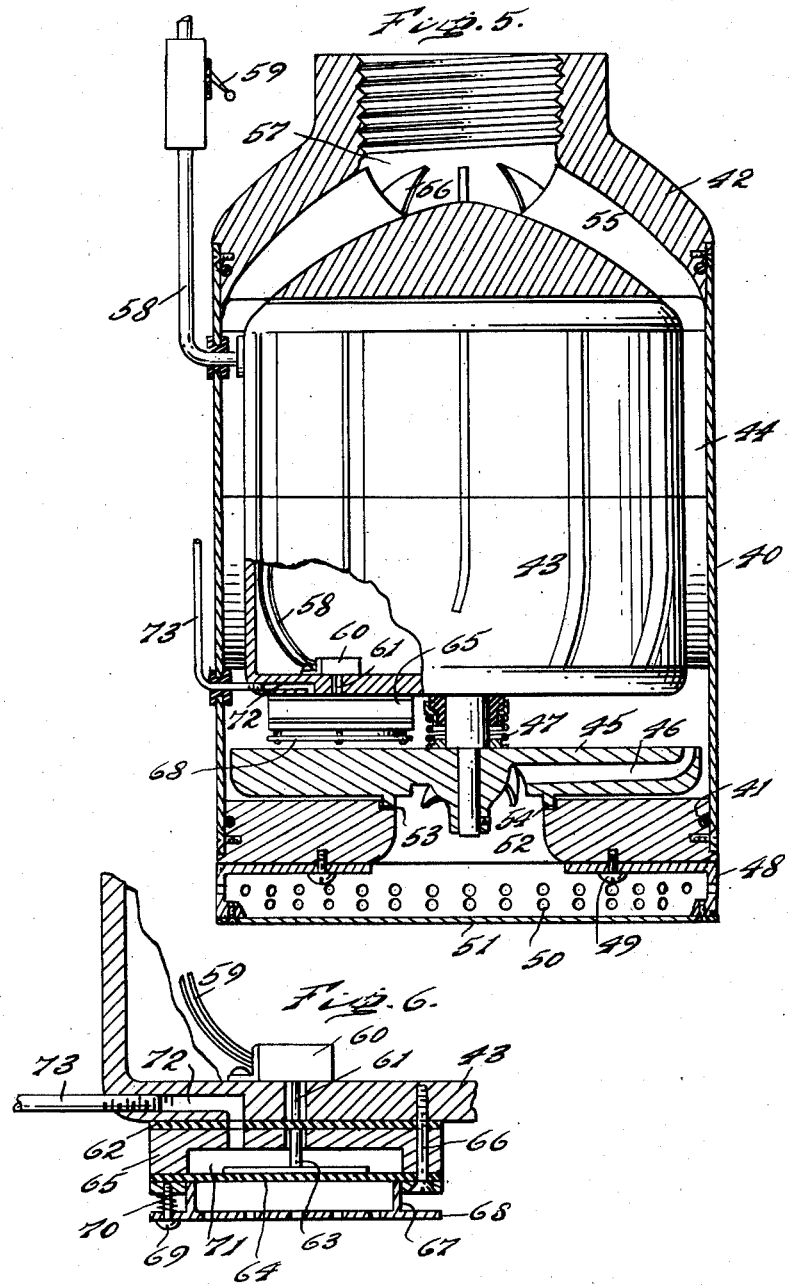

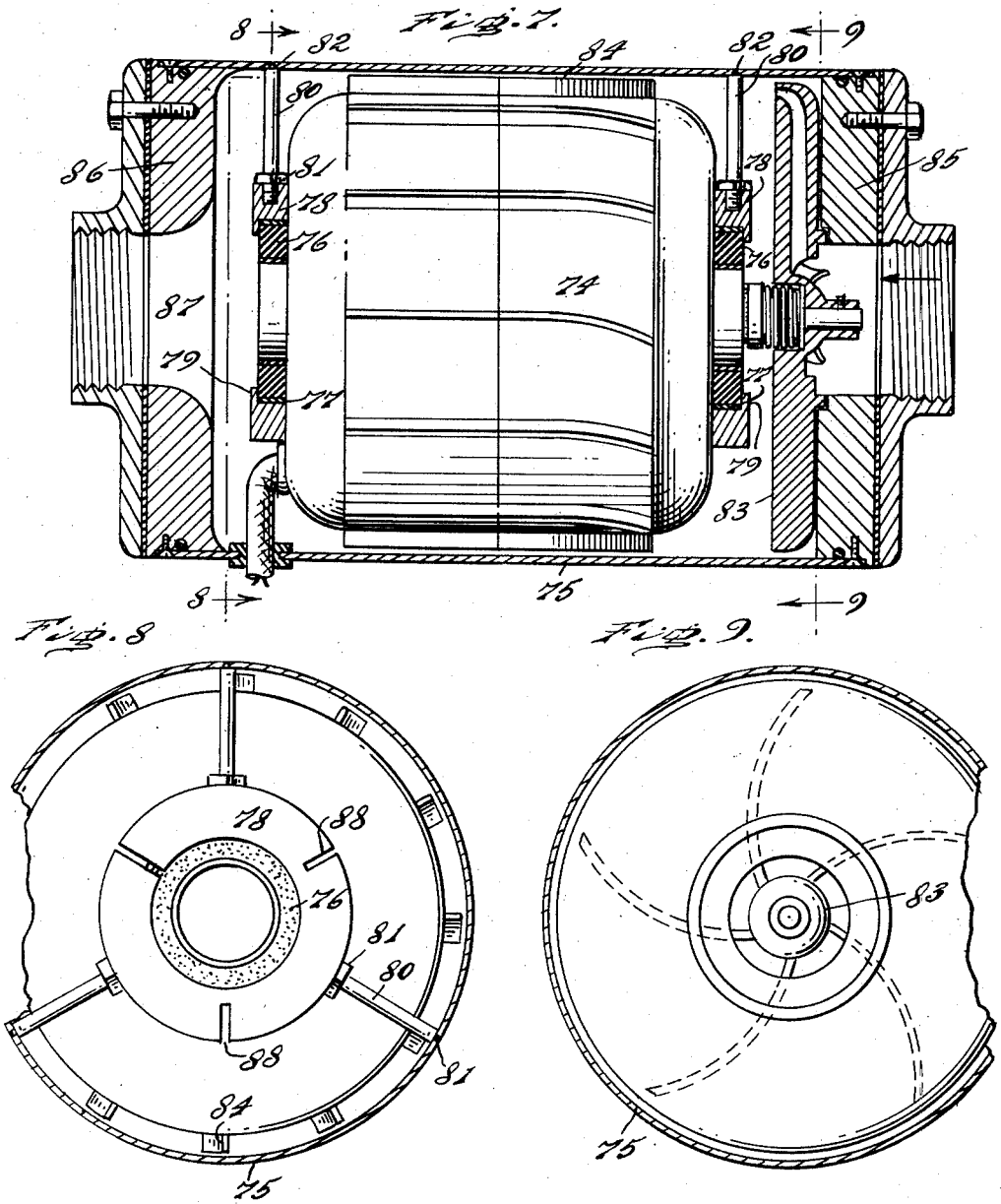

Oct. 28, 1958    A. R. PEZZILLO    2,857,849
MOTOR DRIVEN PUMPING UNITS
Filed Nov. 13, 1953    6 Sheets-Sheet 4
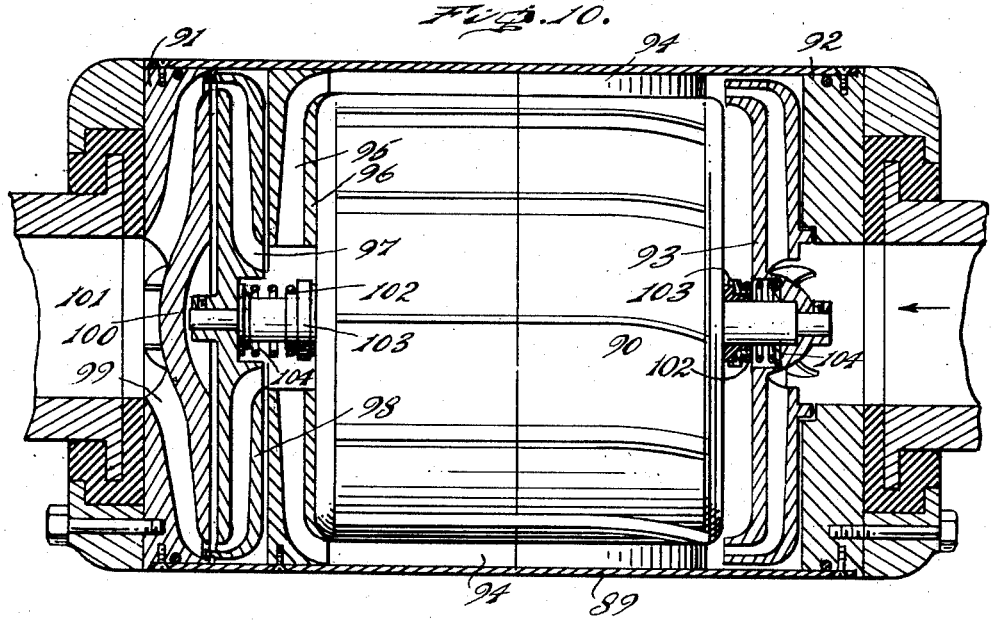
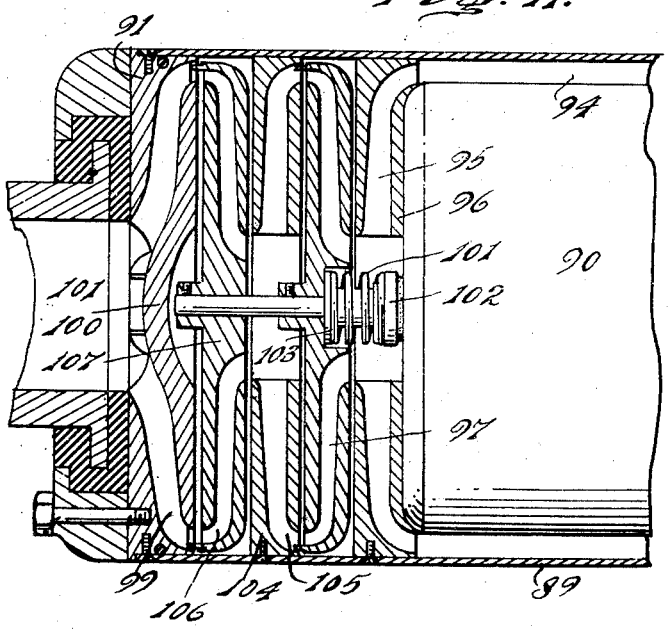
INVENTOR
Albert R. Pezzillo
BY
Herbert P. Fairbanks
ATTORNEY

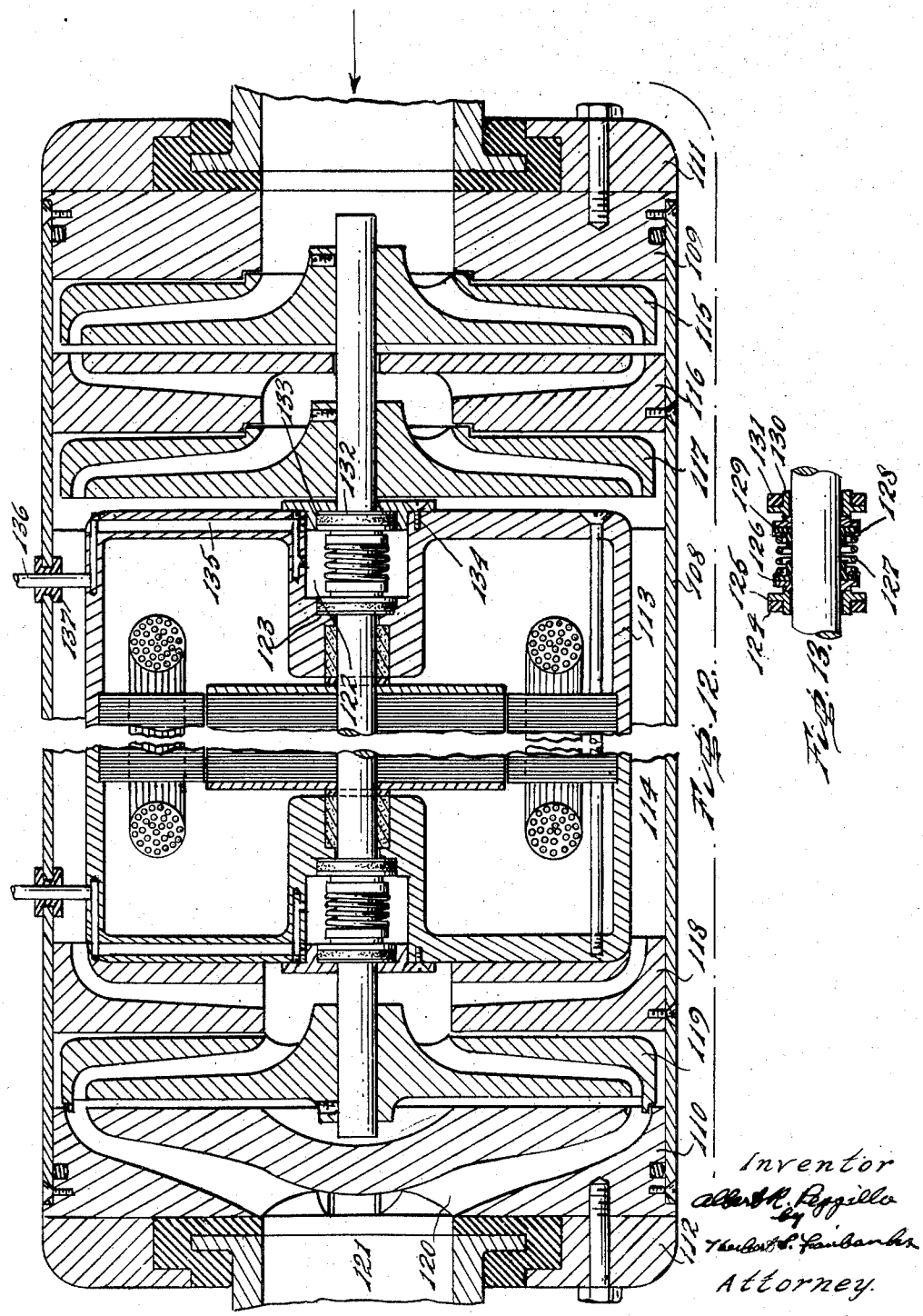

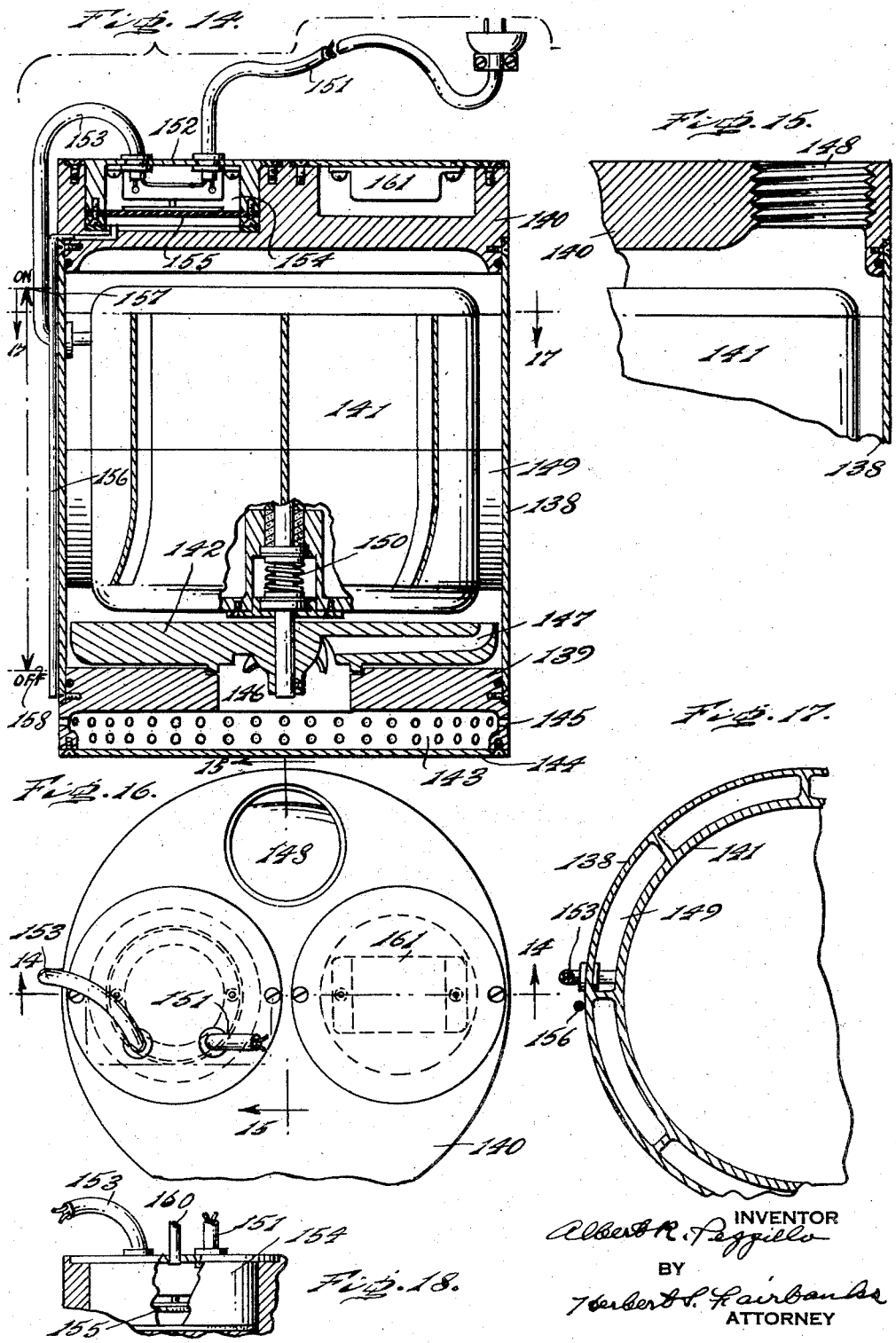

United States Patent Office 2,857,849
Patented Oct. 28, 1958

2,857,849

MOTOR DRIVEN PUMPING UNITS

Albert R. Pezzillo, Philadelphia, Pa., assignor to Joseph R. Smylie, Philadelphia, Pa.

Application November 13, 1953, Serial No. 391,982

1 Claim. (Cl. 103—87)

The object of this invention is to devise a novel motor driven pumping unit which can be connected directly in a fluid line in a vertical, horizontal or angular position, and which, if desired, can be submerged in the fluid being impelled to act as a sump pump.

A further object of this invention is to devise a novel construction and arrangement of the component parts, and wherein the impeller discharges longitudinally instead of radially to overcome the customary turbulence, the discharge being to diffuser passages circumferentially spaced around the motor and having their intake ends curved.

The impeller can be of the same or greater diameter than the motor to provide a high head capacity, and the impeller is mounted in the pumping unit housing in a manner to prevent recirculation.

The motor housing is hermetically sealed from the fluid being impelled so that the pumping unit can be employed with fluid containing abrasives and other deleterious matter.

Lubricating fluid within the motor housing serves for lifetime lubrication and also to disipate heat, and prevent condensation and rust.

The motor employed is preferably a standard type motor and can be of the shaded pole, split phase or polyphase type. For a split phase motor, conventional starting means and overload protector can be mounted within the pumping housing or located at any desired external location.

A further object is to devise novel motor controlling mechanism, adjustable for different fluid levels.

The motor pump unit can be resiliently mounted to absorb and compensate electrical and mechanical vibrations. I overcome the electrical, hydraulic and mechanical troubles heretofore encountered in devices of this character.

With the foregoing and other objects in view as will hereinafter clearly appear, my invention comprehends a novel pumping unit.

For the purpose of illustrating the invention, I have shown in the accompanying drawings preferred embodiments of it which in practice will give satisfactory and reliable results. It is, however, to be understood that the various instrumentalities of which the invention consists can be variously arranged and organized and the invention is not limited except by the scope of the appended claim to the exact arrangement and organization of these instrumentalities as herein set forth.

Figure 1 is a sectional elevation of a pumping unit embodying my invention.

Figure 2 is a section on line 2—2 of Figure 1.

Figure 2A is a modified form showing a different way of forming longitudinal passages.

Figure 3 is a section on line 3—3 of Figure 1.

Figure 4 is a fragmentary section of cable securing and sealing means.

Figure 5 is a sectional elevation of an embodiment of the invention adapted for use as a sump pump.

Figure 6 is a fragmentary section of control means.

Figure 7 is a sectional elevation showing more particularly a resilient motor mounting.

Figure 8 is a section on line 8—8 of Figure 7.

Figure 9 is a section on line 9—9 of Figure 7.

Figure 10 is a sectional elevation of a pumping unit showing an impeller at both intake and discharge ends.

Figure 11 is a fragmentary section of a multi-stage which can be employed at one or both ends of the motor.

Figure 12 is a sectional elevation of another embodiment of the invention, showing multi-stages at the intake and discharge end of the unit.

Figure 13 is a fragmentary view of a sealing device.

Figure 14 is a sectional elevation of another embodiment of the invention for use as a sump pump.

Figure 15 is a fragmentary section showing the discharge opening of the embodiment seen in Figure 14.

Figure 16 is a top plan view of Figure 14.

Figure 17 is a section on line 17—17 of Figure 14.

Figure 18 is a section showing a modified form of vent for the automatic control mechanism.

Similar numerals of reference indicate corresponding parts.

Referring to the drawings:

The housing 1 for the pumping unit is preferably cylindrical in form to slidably receive the housing 2 for the motor, the motor housing being preferably split to aid in such assembly. The motor housing and the pumping housing are sealed at one end due to the provision of an annular groove 3 in the motor housing to receive a sealing ring 4, and the motor housing is fixed to the pumping unit housing by fastening devices 5 of any desired character. An end closure 6 at the intake end of the unit has an annular groove 7 which receives a sealing ring 8 and fastening devices 9 fix the end closure in the pumping unit housing. A coupling bracket 10 at the intake end of the unit is recessed to receive a sealing gasket 11 which in turn is recessed to receive a flange of a pipe connection 12. Fastening devices 13 secure the bracket to the end closure.

At the discharge end of the pumping unit, a similar end closure 14 and gasket 15 is fixed to the motor housing by fastening devices 16. The gasket 15 is recessed to receive the flanged end of a coupling 17.

An impeller 18 is fixed on the motor shaft by a fastening device 19 and is centrally recessed to receive a spring loaded sealing device 20 mounted on the motor shaft and comprising end members with a spring 21 therebetween. The impeller has vanes 22 to direct fluid from the intake 23 to the impeller passages 24 which taper outwardly towards the outer periphery of the impeller and terminate in laterally and forwardly directed passages 25 to impel the fluid through longitudinal passages 26 formed by fins 27 circumferentially spaced around and carried by the motor housing 2 and contacting the inner periphery of the pumping housing 1. The passages 26 lead to tapered discharge passages 28 in the motor housing which terminate at vanes 29 which latter direct the fluid to the outlet 30.

An electric cable 31 from a source of electric supply passes through a threaded bushing 32 which passes through the pumping unit housing and is threaded into the motor housing 2. The bushing is sealed by a sealing washer 33 in a recessed portion of a cap nut 34 and also by sealing ring 35 between a washer 36 and the cap nut.

In Figure 2A, instead of forming fins on the motor housing to form the passages 26 such passages are formed by a corrugated sheet 37 between the two housings.

The end closure 10 has an annular cutout 38 into which an annular rib 39 on the impeller extends to prevent recirculation of fluid.

Referring now to Figures 5 and 6, I have shown in these figures substantially the same construction as in Figure 1 modified to provide a sump pump with an automatic control.

A pumping unit housing 40 in the form of a cylinder has an end closure 41 at the intake end and an end closure 42 at the discharge end. A motor 43 has the passages 44 and fixed on the shaft of the motor is an impeller 45 having impeller passages 46. The motor shaft has a spring loaded sealing device 47. A bottom intake casing 48 is fixed to the end closure 41 by fastening devices 49 and has a multiplicity of side openings 50 and a bottom closure plate 51. The end closure 41 has an intake 52 leading to impeller vanes and to the impeller passages 46. To prevent recirculation the groove 53 and rib 54 are provided.

The upper end closure 42 has tapered passages 55 leading to directional vanes 56 to direct fluid to the outlet 57. An electric cable 58 for the motor has a control switch 59. An automatic switch shown more in detail in Figure 6 has a control box 60 within the pumping unit housing and provided with a contact rod 61 contacting a sealing member 62 which latter is contacted on its opposite side by a stud 63 fixed to a flexible diaphragm 64. The sealing member 62 is fixed in position by a casing member 65 fixed to the motor housing by fastening devices 66 consisting of a ring and screws, the screws passing through the ring, casing member 65 and the sealing member 62. The flexible diaphragm 64 is contacted by a ring 67 having an apertured flanged bottom 68. Fastening devices 69 have a clearance in the flanges and engage the ring of fastening devices 66 and a spring 70 surrounds each fastening device and tends to move the ring 67 downwardly. A chamber 71 connects by passage 72 with a pipe extending through the pumping unit housing and deflected upwardly to a desired heighth with its upper end open to atmosphere, the pipe being shown at 73 in Figures 5 and 6.

In Figures 7, 8 and 9, instead of having the motor housing rigidly mounted within the housing of the motor pumping housing it is resiliently mounted, the motor housing 74 being mounted within the pumping unit housing 75 on resilient, annular cushioning members 76 having an outer strip 77 and seated in supporting rings 78, the latter having outer flanges 79 overhanging the cushioning members 76. The rings 76 are supported by radially disposed rods 80 in threaded engagement therewith and provided with lock nuts 81 to fix their inner ends, the outer ends of the rods being of reduced diameter to fit into recesses 82 in the pumping unit housing 75.

The impeller 83 is constructed and mounted in the same manner as shown in Figure 1. Circumferentially spaced fins 84 define longitudinally extending passages. The end closure 85 is the same as in Figure 1, and the other end closure 86 has a converging outlet 87. The pipe connections are conventional for connection of the unit in a pipe line.

The rings 78 preferably have circumferentially spaced slots 88 to provide resiliency.

Referring now to Figure 10, an impeller can be provided at the intake and discharge end of the pumping unit. The pumping unit housing 89 has mounted within it a motor unit housing 90, and end closures 91 and 92 are sealed in the ends of the pumping unit housing 89.

The motor drives an impeller 93 to impell the fluid through passages 94 to diffuser passages 95 in a diffuser 96, the fluid then passing to impeller passages 97 in an impeller 98 fixed on the motor shaft. The fluid then passes to diffuser passages 99 in an end closure 100 and therefrom to the outlet 101. At each end of the motor a sealing device is employed comprising a spring 102 between sealing members 103 and 104, the impeller being recessed to receive one of the sealing members. The end brackets for connection with a pipe line are the same as hereinbefore described.

In Figure 11, I have shown how a multi-stage can be employed, it being understood that such stage may be at one or both ends of the motor. Except for the additional stage, the construction is the same as Figure 10 with the pumping unit housing lengthened to provide space for the extra stage. A diffuser 104 has diffuser passages 105 receiving fluid from the impeller passages 97 and discharging to impeller passages 106 of the second impeller 107 which in turn discharges to diffuser passages 99.

In Figure 12, I have shown how two impellers can be employed at the intake end and a single impeller at the discharge end of the pumping unit. The pumping unit housing 108, end closures 109 and 110, and pipe connections 111 and 112 are similar to those hereinbefore described and the motor unit 113 has the channels 114 at its periphery. The first impeller 115 passes fluid through the diffuser 116 to the second impeller 117. The fluid passes through channels 114, through diffuser 118 to impeller 119, and therefrom to diffuser passages 120 in end closure 110 and to outlet 121.

The hubs of the motor housing has chambers 122 to receive sealing mechanism shown in detail in Figure 13.

The inner end wall of a recess or chamber 122 is recessed to receive a ring 123 against which a sealing washer 124 bears, the washer being carried by a flanged ring 125. Flanged rings 126 are arranged back to back, a spring 127 being between one of the rings 126 and a sealing ring 128 seated in a ring 129 which bears against a flanged ring 130 carrying a sealing ring 131 which bears against a ring 132 seated in a flanged closure 133 which closes one end of the chamber 122 and is fixed in position by a fastening device 134. A lubricating passage 135 in the motor housing communicates with a pipe 136 extending through a seal 137 in the pumping unit housing and provides for the introduction of lubricant to the chamber 122 and the shaft sealing means.

Referring to Figures 14 to 18 inclusive, I have shown in these figures an embodiment of the invention arranged to function as a sump pump. The pumping unit housing 138, end closures 139 and 140, motor pump unit 141 and impeller 142 are broadly similar to corresponding parts in other figures of the drawings. The end closure 139 at the bottom is recessed to form a chamber 143 having a bottom closure 144 and side openings 145, which lead to the inlet 146 and impeller passages 147. The top closure 140 has an outlet 148. Longitudinal channels 149 are provided between the motor housing and the pumping unit housing. The sealing device 150 is the same as hereinbefore described in connection with other figures of the drawings. An electric cable 151 from a source of electric supply leads to an automatic control 152 connected by line 153 with the motor. The control 152 is within a chamber 154 in the end closure 140 and is controlled by a diaphragm 155.

A pipe 156 is in communication with the chamber 154 beneath the diaphragm and extends downwardly exterior of the pumping unit housing to a desired distance and is open at its lower end. The lines 157 and 158 indicate the heights at which the controlling mechanism is actuated to stop and to start the motor with a length of pipe as shown, it being understood that the length of the exterior portion of the pipe may vary in accordance with conditions met with in practice. The lower portion of this pipe is preferably rubber or its equivalent slipped on to the main portion of the pipe and of a desired length. The chamber above the diaphragm is vented to atmosphere by a separate vent 160. A starting switch and overload relay 161 may be located in the upper end closure.

The operation will now be clear to those skilled in this art and is as follows:

In all of the embodiments of my invention as herein shown, the impeller passages, instead of discharging radially, discharge axially or in other words longitudinally to channels extending longitudinally exterior of the motor housing, and therefrom to the outlet preferably through diffuser passages. The longitudinal passages are circumferentially spaced around the motor housing and are preferably curved at the intake end portions of the channel. The ribs or fins which form such channels may be integral with the motor housing; integral with the pumping unit housing and the motor housing; or the channels may be formed by a deformed strip as in Figure 2A.

In Figure 1, the fluid passes from the impeller through the passages 26 and diffuser passages 28 to the outlet. In this case the diffuser passages are formed in an end of the motor housing.

In Figures 5 and 6, a sump pump is shown. The fluid drawn in through openings 50 passes through an opening in the bottom closure 41 to impeller passages 46 and therefrom to and through channels 44 to diffuser passages 55. In this embodiment, the switch 60 is within the motor housing to be lubricated by the lubricant therein, and the switch operating means is in a pressure chamber below the motor to be subjected to the pressure therein and the pressure created by the impeller.

The diaphragm 64 is exposed to the fluid and as the fluid rises in the sump it creates a pressure on the bottom of the diaphragm. The water rises until the pressure actuates the diaphragm controlled switch to close the motor circuit. Upon starting of the motor, the impeller exerts constant pressure against the diaphragm to maintain the switch closed until the water level in the sump drops to a point where the impeller sucks air and thereby reducing pressure against the bottom of the diaphragm, and the switch opens by a spring conventional in the control switch, the diaphragm assuming its neutral position.

In the embodiment seen in Figures 7, 8 and 9, the channel formnig fins or ribs do not contact the pumping unit housing since the motor unit is resiliently supported. The operation of this embodiment will be clear from the foregoing description. In Figure 10 an impeller is at each end of the motor, the intake impeller discharging to the longitudinal channels, therefrom to a diffuser and then to an impeller at the discharge end, to a diffuser and to the outlet.

In Figure 11 the operation is similar, a plurality of impellers and diffusers being mounted on one or both ends of the shaft of the motor.

In Figure 12 a plurality of impeller arrangements are shown two impellers being at the intake end and a single impeller arrangement being at the discharge end, and the operation will be clear from the description of other embodiments.

In the embodiment seen in Figures 14 to 18 inclusive, the invention is shown in the form of a sump pump having a modified form of automatic control. The fluid is drawn in through the chamber 143 to impeller passages 147, and passes axially therefrom to passages 149 and to outlet 148. The automatic control is mounted in the upper closure 140. The chamber above the diaphragm 155 is vented to atmosphere through electric cable 151 which is standard, or by an atmospheric vent 160 shown in Figure 18. The fluid in the sump creates a pressure on the air in the tube 155 and this air pressure on the diaphragm 155 closes the switch and retains it in closed condition until the level of the fluid in the sump falls to a predetermined point whereupon the diaphragm returns to its neutral position by a spring conventional in the control switch.

In the control mechanism shown in Figures 5 and 6, the tension on the diaphragm can be adjusted to control its sensitivity and for adjusting it for differential pressures.

In all of the embodiments of the invention, life time lubricant is in the motor housing or provision is made for the introduction of lubricant. This lubricant lubricates the sealing means which is preferably sealed within a recess in the motor housing, see Figures 12 and 14.

Having thus described my invention, what I claim as new and desire to secure by Letters Patent is:

In a motor driven pumping unit, a pumping unit having an inlet and an outlet and a cylindrical bore, a motor housing having a slidable fit in said bore and provided with a multiplicity of circumferentially spaced passages extending longitudinally the length of said motor housing, an impeller on the motor shaft having a peripheral flange and having impeller passages discharging axially through said peripheral flange into said passages, and spring loaded sealing members for the motor shaft within the motor housing and lubricated by the lubricant therein, and sealed from the fluid being impelled.

References Cited in the file of this patent

UNITED STATES PATENTS

| | | |
|---|---|---|
| 854,012 | Akimoff | May 21, 1907 |
| 1,425,308 | Woock et al. | Aug. 8, 1922 |
| 1,968,566 | Moran et al. | July 31, 1934 |
| 2,102,304 | Charbonneau | Dec. 14, 1937 |
| 2,320,708 | Yost | June 1, 1943 |
| 2,506,827 | Goodner | May 9, 1950 |
| 2,645,086 | Carter | July 14, 1953 |
| 2,731,918 | Schaefer | Jan. 24, 1956 |